May 14, 1963 F. W. R. STARP 3,089,397
PHOTOGRAPHIC INTRA-LENS SHUTTER AND COUPLED EXPOSURE METER
Filed Feb. 13, 1957 2 Sheets-Sheet 1

INVENTOR.
Franz W. R. Starp
BY
Munn, Liddy, Daniels & March
ATTORNEYS

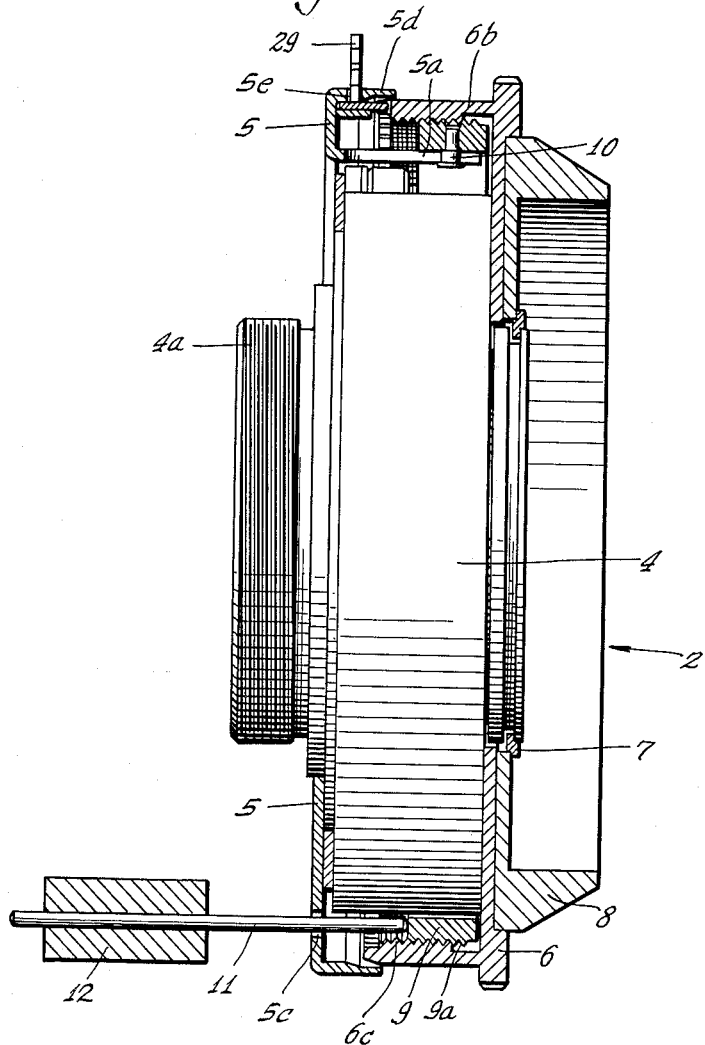

United States Patent Office
3,089,397
Patented May 14, 1963

3,089,397
PHOTOGRAPHIC INTRA-LENS SHUTTER AND COUPLED EXPOSURE METER
Franz W. R. Starp, Calmbach (Enz), Germany, assignor to Alfred Gauthier G.m.b.H., Calmbach (Enz), Germany, a corporation of Germany
Filed Feb. 13, 1957, Ser. No. 639,993
Claims priority, application Germany Feb. 23, 1956
2 Claims. (Cl. 95—10)

This invention relates to photographic camera structures, and more particularly to cameras employing intralens shutters with coupled exposure meters, and employing setting members for diaphragm and shutter speeds, arranged coaxially with respect to the shutter axis.

An object of the invention is to provide in a camera structure of the above type, a novel and improved coupling means between the diaphragm and speed setting members and the exposure meter to effect correlation of the movements thereof, said means being extremely compact, constituted of relatively few parts, and requiring a minimum of space in or on the camera.

In accomplishing the above, I provide on the shutter structure, coaxially arranged with respect to the diaphragm and shutter speed setting members, a control ring connected to drive or actuate a tracing member of the exposure meter, said control ring being axially shiftable in directions parallel to the shutter axis by means of a cam connection with one setting member and a slide or guide connection to the other setting member.

A feature of the invention resides in the provision of an improved coupling means as above set forth, which is so constituted as to be fully enclosed by the exterior members of the intra-lens shutter structure, thereby to safeguard it against coupling means is disposed externally of the shutter housing and within a cylindrical mantle carried by one of the setting members, which mantle overlaps the shutter housing for this purpose.

Further, the cam device or connection of the coupling means comprises threads carried by said overlapping cylindrical mantle and by the said axially movable control ring, said threads being preferably of the multiple type to effect a smooth and positive, jam-free action of the ring.

While, in the specific embodiment of the invention illustrated herein, the cam device is constituted as coengaging sets of threads, it will be understood such device may be otherwise constituted, for example by grooves or slots on one part, receiving pins, lugs or the like on the cooperable part.

Further, in carrying out the invention, there is provided a simple and economical-to-fabricate slide or straight guide for the control ring, including an arm carried by one setting member and extending parallel to the shutter axis, said arm being in the nature of a fork into which a pin or lug extends, the latter being carried by the said ring.

The control ring is coupled to the exposure meter through the medium of a transmission member carried by the camera structure, said transmission member having an abutting connection with a tracing member of the exposure meter. Advantageously the transmission member may be in the form of a simple, axially movable pin shiftable in a direction parallel to the shutter axis.

Moreover, the tracing member of the exposure meter may be constituted as a turnable disk carrying a rotatably shiftable indicator ring coaxial with the disk and having an index mark cooperating with the pointer of the exposure meter, there being a film sensibility scale and a second index mark cooperable therewith, carried by the disk and ring to adjust for different film sensitivities.

To provide for either concurrent or independent movement of the settable members, there is provided a well known type of releasable latch or coupling means.

In the drawings, illustrating one embodiment of the invention, similar characters of reference are used throughout the various views wherever possible.

FIGURE 2 is a view partly in axial section and partly in elevation, of the shutter mechanism of FIGURE 1 and of a portion of the improved coupling means as provided by the invention.

Figure 1:
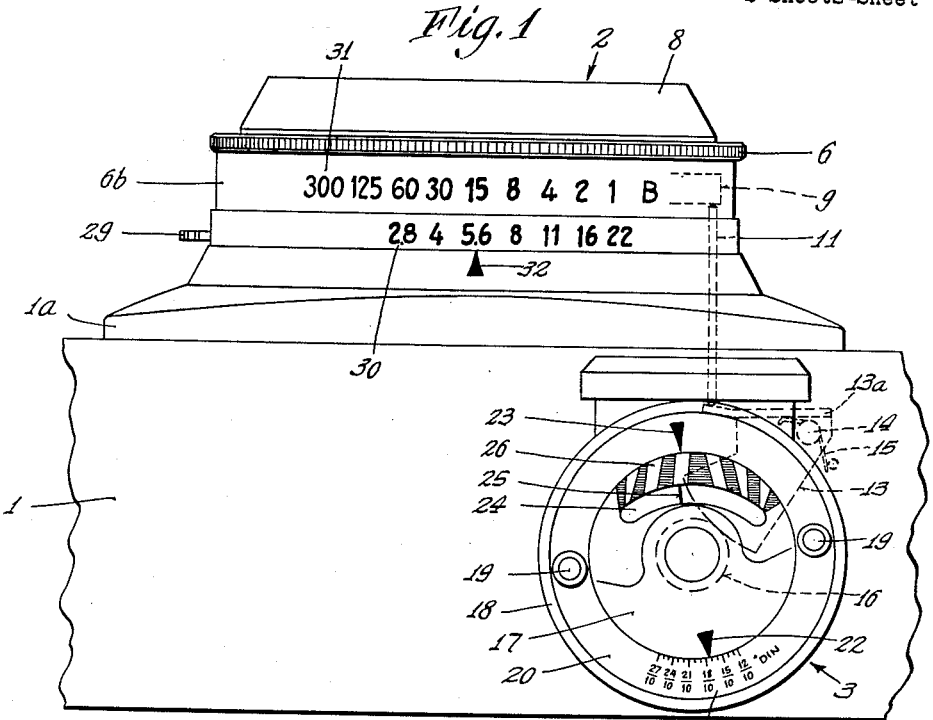
FIGURE 1 is a fragmentary top or plan view of a photographic camera having an intra-lens shutter and coupled exposure meter, made in accordance with the invention.

Referring to FIGURE 1, the housing of the camera is indicated at 1, said housing having a front plate 1a on which there is mounted an intra-lens shutter designated generally by the numeral 2. The camera housing 1 also mounts on exposure meter 3 possessing the well-known photosensitive element as well as an electrical-instrument type of measuring device.

The shutter 2 may have the usual well-known structure, including a shutter housing 4 carried by a nozzle 4a (FIGURE 2) which also serves to mount the various lens elements. The nozzle 4a is preferably externally threaded, for attachment to the camera housing 1.

As the rear of the shutter structure 2 there is mounted in the well-known manner a diaphragm setting ring 5, and on the surface of the side wall of the housing 4 there is carried a knurled shutter-speed setting ring 6, the latter being secured against axial movement by means of a locking ring 7 and a front plate 8.

Additionally, the shutter 2 possesses the usual cocking and releasing means, which have not been drawn for reasons of clarity and since they constitute no part of the present invention.

In accordance with this invention there is arranged coaxially with respect to the setting rings 5 and 6 an axially movable control ring 9 connected, as will be later brought out in detail, with a tracing member of the exposure meter 3 to actuate the latter. In actuating the control ring 9 I provide a cam device arranged between the ring and one of the setting members, and also a straight slide or guide between the ring 9 and the other setting member, thereby to effect an axial shifting movement of the control ring in response to relative turning movement of the setting rings.

In the specific embodiment of the invention illustrated herein, the control ring 9 is advantageously fully enclosed and made inaccessible from the exterior, as well as being hidden from sight, and in effecting this the ring is disposed between the outer circumference of the shutter housing 4 and a cylindrical mantle 6b carried by the shutter-speed setting ring 6. The control ring 9 overlies or overlaps the circumference of the shutter housing, as clearly seen in FIGURE 2.

The cam device provided between the control ring 9 and one of the setting members may advantageously comprise an external thread 9a on the ring 9 (FIGURES 2 and 3) engaging an internal thread 6c disposed at the inner surface of the cylindrical mantle 6b. With such organization, relative turning between the control ring 9 and the speed setting ring 6 will result in relative axial movement in one direction or the other, depending on the direction of turning.

Figure 3:
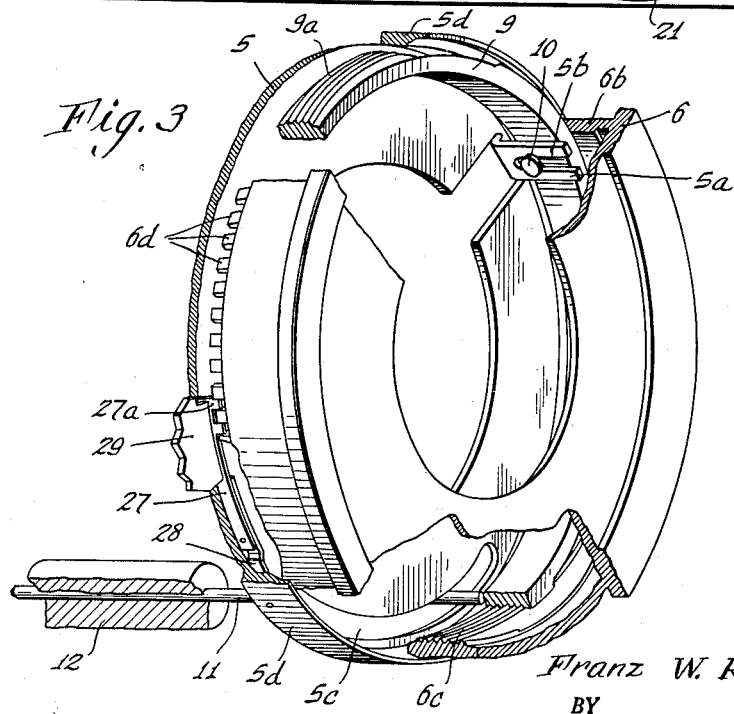
FIGURE 3 is a perspective view of the shutter structure and improved coupling means of FIGURE 2, with portions broken away to reveal interior details.

The present improved coupling or control device further comprises a straight slide or guide connected to the control ring 9 and the diaphragm setting ring 5, such slide preventing relative turning movement between these two rings but permitting relative axial movement to take place. I construct such guide in a simple manner by providing a forked arm 5a on the diaphragm setting ring 5, said arm extending laterally of the ring and parallel to the axis of the shutter structure 2. The arm 5a has a slot 5b in which a pin 10 is movable, said pin being carried by the control ring 9 and extending inwardly therefrom, as shown in FIGURES 2 and 3.

By virtue of the slide connection between the diaphragm setting ring 5 and control ring 9, and the cam connection between the latter ring and the speed setting ring 6 any relative turning movement between the said setting rings will result in axial movement of the control ring.

Preferably, for the purpose of effecting a smooth and positive, jam-free movement of the control ring 9 for all relative positions of the setting rings, the threads 9a and 6c are made as multiple threads rather than as single threads.

While I have illustrated and described the cam device between the control ring 9 and the speed setting ring 6 as having the form of screw threads, it will be understood that other equivalent cam devices may be readily employed, as for example sloping grooves or slots engaged by pins, lugs or the like.

In accordance with this invention, the axial movement of the control ring 9 is utilized to actuate a tracing member of the exposure meter 3, and this is accomplished in a simple and advantageous manner, in the illustrated embodiment of the invention, by the provision of a cylindrical pin 11 axially movable in a guide bushing 12 which is mounted in the housing 1 of the camera structure. The bushing 12 preferably carries the pin 11 in such a manner that the latter is movable in a direction parallel to the axis of the shutter 2. One end of the pin 11 extends through a slot 5c provided in the diaphragm setting ring 5 and is adapted to engage the rearwardly facing edge of the control ring 9.

The other end of the transmission pin 11 is engageable with a lug 13a (FIGURE 1) of a toothed segment 13 pivotally carried by a pivot pin fixed to the camera housing 1. As seen in FIGURE 1, the lug 13a is disposed generally in a plane which extends transversely of or at right angles to the axis of the shutter structure 2.

The toothed segment 13 is acted on by a wire spring 15 which is carried by the pivot pin 14, thereby to bias the segment 13 clockwise, as viewed in FIGURE 1, and accordingly such spring will maintain the transmission pin 11 in continual engagement with the control ring 9, as shown.

The toothed segment 13 meshes with a gear 16 which is carried by a disk-shaped member 17 having a ring-shaped rim 18. The member 17 rotatably mounts an indicator 20 adapted to be manually shifted by means of gripping pins 19 secured thereto and extending outwardly therefrom. On the ring 20 there is provided a film sensibility scale 21 which is cooperable with the index mark 22 carried by the member 17. Also, the ring 20 carries an index mark 23 which is cooperable with a pointer 25 of the instrument movement of the exposure meter 3. Such pointer is visible through an arcuate window 24 of the exposure meter.

For the purpose of obtaining a linear exposure setting where the instrument movement has a non-logarithmic characteristic, there is arranged in the well known manner between the window 24 and the inner diameter of the ring 20 a channel scale 26 to which the pointer 25 and index mark 23 may be referred.

For the purpose of releasably latching or coupling together the diaphragm setting ring 5 and the speed setting ring 6 there is provided a releasable coupling device comprising equispaced lugs 6d disposed on the ring 6, said lugs being engageable with fingers 27a carried by a lever 27 pivotally connected by a pin to a cylindrical mantle 5d of the diaphragm setting ring 5. The lever 27 is normally biased outward against a mantle 5d of the setting ring 5. The division of the scales 30 and 31 represent preferably a multiple of the spacing of the lugs 6d.

It will now be understood that concurrent movement or independent movement of the setting rings 5 and 6 may be effected at the will of the operator, by proper actuation of the handle 29 of the coupling device. When both rings are moved simultaneously, a turning of the control ring 9 will be effected, but no axial movement of such ring will take place. When the latching connection between the setting rings is disengaged and relative turning is effected between said rings, axial movement of the control ring 9 will occur, either with or without rotative movement thereof, and such axial movement will axially shift the transmission pin 11, causing either clockwise or counterclockwise turning of the toothed segment 13, the gear 16, disk-shaped member 17, 18 and the scale ring 20.

Operation of the improved control device of this invention is as follows:

(1) Setting the film sensibility: To do this, the ring 20 is adjusted by grasping the pins 19 so as to bring the proper value on the scale 21 opposite to the index mark 22.

(2) Setting the time-diaphragm proportion corresponding to the exposure meter indication: After the above adjustment has been made for film sensibility, the coupling connection between the setting rings 5 and 6 is released by pressing down the actuating handle 29. Then, while still holding down the said handle, either the diaphragm setting ring 5 or the speed setting ring 6 is turned until the index mark 23 on the ring 20 is correlated through the channel scale 26, with the pointer 25 of the exposure meter instrument movement. This turning of one of the setting rings with respect to the other effects such adjustment through the axial displacement of the control ring 9, as already explained above, and when the index mark 23 has thus been properly set it will mean that the time-diaphragm proportions is correct for the light conditions prevailing at the time, and for the film sensibility setting previously made. The handle 29 is now released, thereby coupling together the setting rings 5 and 6.

If during the actuation of one or the other of the setting rings as above outlined such ring comes into its end position without the index mark 23 being properly related with the pointer 25, the desired positioning may be effected by actuating the other setting ring, as will be understood.

(3) Diaphragm-time selection: The selection of a diaphragm time value pair which is adapted to the particular object to be photographed is now done by turning the coupled setting rings. This movement, however, will not disturb the axial position of the control ring 9 but instead merely turn such control ring, and therefore there will be no disturbance of the index mark 23 from its previous proper setting.

It will be now understood that, in accordance with the above structure, I have provided a novel and improved coupling or control device between the setting rings of the intra-lens shutter 2 and the tracing member of the exposure meter 3, which device is extremely simple and economical to construct and reliable in its operation while at the same time enabling quick and accurate, semiautomatic exposure settings to be had.

Moreover, my improved device does not require any space in the interior of the shutter housing 4 nor does it axially displace the shutter structure in any way. The improved coupling or control device as provided at the shutter is extremely compact and saving of space, and requires that the camera housing carry only the single transmission member or pin 11, of the simplest possible type.

Variations and modifications may be made within the scope of the claims, and portions of the improvements may be used without others.

I claim:

1. A photographic camera comprising
 (a) a housing having a front plate,
 (b) an exposure meter including a tracing means mounted on said housing, (c) an intra-lens shutter means mounted on said front plate,
(d) said shutter means including a diaphragm setting ring,
(e) a shutter speed setting ring,
(f) means for securing said shutter ring so as to prevent axial movement thereof,
(g) and a control ring coaxially disposed between said setting rings,
(h) a threaded connection between said control ring and said shutter speed setting ring,
(i) a slide connection between said control ring and said diaphragm setting ring,
(j) said threaded connection and slide connection between said control ring, and said diaphragm setting ring and shutter speed setting ring, respectively, coacting to effect axial shifting of said control ring in response to relative turning movement of said setting rings,
(k) said control ring being fully enclosed by a mantle carried by said shutter speed setting ring,
(l) means connecting said control ring with said tracing means of said exposure meter,
(m) said latter means including a transmission pin movable in a direction parallel to the axis of said shutter means,
(n) one end of said pin engaging said control ring in abutting relationship, and said pin being extended through a slot formed in said diaphragm setting ring,
(o) the other end of said pin engaging with said tracing means whereby axial displacement of said control ring upon relative movement of said setting rings effect proportionate movement of said tracing means,
(p) and coupling means for releasably connecting said shutter speed setting ring to said diaphragm setting ring for effecting either concurrent or independent movement of said setting rings,
(q) said coupling means including a series of circumferentially spaced lugs connected to said shutter rings, and extending laterally therefrom,
(r) a cooperating lever pivotally mounted to said diaphragm setting ring, for movement between operative coupling position and inoperative non-coupling position,
(s) said lever having spaced fingers for meshing with said lugs to effect coupling of said setting rings in the operative position of said lever, to effect concurrent movement of said setting rings when said lever is rendered operative whereby axial movement of said control ring is prohibited.

2. The invention as defined in claim 1 wherein said tracing means comprises
(a) a turnable disk part,
(b) a ring part movably mounted on said disk part,
(c) said ring part having an index mark thereon adapted to cooperate with the pointer of said exposure meter,
(d) a film sensibility scale located on one of said parts,
(e) and a cooperating indicating mark located on the other of said parts opposite said scale,
(f) a gear connected to said disk part,
(g) a gear sector pivotally mounted to said housing and disposed in meshing relationship with said gear,
(h) and said end of said transmission pin engaging said gear sector whereby axial displacement of said control ring effects movement of said gear sector and cooperating gear to effect movement of said disk part accordingly.

References Cited in the file of this patent

UNITED STATES PATENTS

| | | |
|---|---|---|
| 2,360,256 | Mihalyi | Oct. 10, 1944 |
| 2,467,946 | Rossman et al. | Apr. 19, 1949 |
| 2,576,813 | Simons | Nov. 27, 1951 |
| 2,829,574 | Gebele | Apr. 8, 1958 |
| 2,874,622 | Gebele | Feb. 24, 1959 |

FOREIGN PATENTS

| | | |
|---|---|---|
| 179,192 | Austria | July 26, 1944 |
| 756,282 | Germany | Feb. 23, 1953 |
| 1,111,448 | France | Oct. 26, 1955 |